United States Patent [19]

Harlan

[11] 3,758,119

[45] Sept. 11, 1973

[54] AUTOMATIC EJECT MECHANISM FOR CASSETTE TAPE PLAYER

[75] Inventor: Alfred R. Harlan, Glendale Heights, Ill.

[73] Assignee: Motorola, Inc., Franklin Park, Ill.

[22] Filed: July 1, 1971

[21] Appl. No.: 158,752

[52] U.S. Cl. .................................................. 274/4 E

[51] Int. Cl. ....................... G11b 23/14, G11b 15/24

[58] Field of Search ..................... 274/4 B, 4 C, 4 E, 274/4 F, 11 B, 11 C; 179/100.2 Z; 242/197–200, 55.19 A

[56] References Cited

UNITED STATES PATENTS

| | | | |
|---|---|---|---|
| 3,599,985 | 8/1971 | Huber | 274/4 B |
| 3,638,953 | 2/1972 | Kodama | 274/4 E |
| 3,669,455 | 6/1972 | Cicatelli | 274/4 E |
| 3,669,456 | 6/1972 | Oteki | 274/4 C |

*Primary Examiner*—Louis R. Prince
*Assistant Examiner*—Dennis A. Dearing
*Attorney*—Vincent Rauner et al.

[57] ABSTRACT

Automatic eject apparatus for use in a cassette tape player includes a pivotal, spring biased lever arm movable to an eject-ready position upon operation of a manual actuator arm from a first to a second position for the purpose of moving a cassette into the play position in the tape player. The armature of a solenoid coupled to a latch arm engageable with the lever arm upon moving the latter to the eject-ready position, is magnetically held by a holding coil to maintain the lever arm in the eject-ready position. Removal of power from the holding coil unlatches the lever arm which in turn engages the actuator arm to move the cassette out of the play position. An overcenter spring connected to the latch arm aids in moving the solenoid armature into engagement with the holding coil and returning the armature and latch arm to their initial positions upon de-energization of the holding coil. A second, spring biased pivotal lever arm movable also from an unlatched to a latched position, ejects the cassette from the player upon removal of power from the latter.

4 Claims, 6 Drawing Figures

INVENTOR:
ALFRED R. HARLAN
BY: Ronald J. LaPorte
ATTY.

INVENTOR:
ALFRED R. HARLAN
BY: Ronald J. LaPorte
ATTY.

AUTOMATIC EJECT MECHANISM FOR CASSETTE TAPE PLAYER

BACKGROUND

This invention relates generally to cassette tape players and more particularly to mechanisms for ejecting a tape cassette from a player automatically upon removal of power from the player.

It is advantageous in a tape player using cassette tapes wherein the cassette is inserted to a play position whereat a capstan drive roller and tape head are moved into engagement with the magnetic recording tape therein, to provide some means which automatically moves the cassette out of the play position in the event power to the player is removed. Normally, manual eject means are provided, but if the power is removed at a time when the operator neglects to or cannot manually eject a cassette, damage to the player components and the tape may result. The latter often occurs in the case of a tape player mounted in an automobile when the cassette is inadvertently left in the player in the play position subsequent to turning off the ignition.

Conventionally, no automatic eject means are provided in cassette tape players partly because the cost to do so would increase the total cost of the cassette player prohibitively. Thus, one must rely only on his memory and the manual eject means provided.

One solution to the cost problem is to provide a unit including an automatic eject mechanism which can be easily fitted to a standard cassette tape player.

SUMMARY

Accordingly, it is a primary object of the present invention to provide for use with a cassette type tape player, new and improved eject apparatus which automatically moves a cassette out of the play position in the event power to the player is removed.

It is another object of the present invention to provide automatic eject apparatus of the above-described type which is included in an adapter unit fitted for use with a conventional cassette tape player.

Briefly, a preferred embodiment of automatic eject apparatus for a cassette tape player according to the invention includes a lever arm which is pivotal about one end thereof from a first to a second position in response to the operation of a manual actuator which also moves a cassette already inserted into the player from an intermediate position to a play position. A coil spring is connected to the opposite end of the pivotal lever arm and is tensioned upon moving the arm to the second position.

A solenoid included in the apparatus has an armature mechanically coupled to a pivotally mounted latch arm which in turn is coupled mechanically to the lever arm. An over-center spring is connected to the latch arm.

Upon operation of the manual actuator from the first to the second position for moving the cassette from the inserted position to the play position, the lever arm is pivoted into engagement with the latch arm. A resulting pivotal movement of the latch arm in a first direction causes the overcenter spring to snap from a first to a second stable condition, thereby pivoting the latch arm rapidly, further in the first direction. The pivotal movement of the latch arm causes the armature, coupled thereto, to move into engagement with the holding coil of the solenoid. The coil is energized to retain magnetically the armature in engagement therewith. The latch arm maintains the lever arm in a pivotal position against the force of the tensioned coil spring.

Removal of power from the tape player de-energizes the holding coil and releases the armature. The tensioned coil spring attached to the lever arm thereby is free to pivot the lever arm to its initial position, thus operating the manual actuator from the second to the first position thereby moving the cassette from the play position. The second arm is pivoted also in a direction opposite from the first pivotal direction to snap the overcenter spring to its first stable condition, thereby returning all elements to their initial positions.

DETAILED DESCRIPTION

Figure 1:
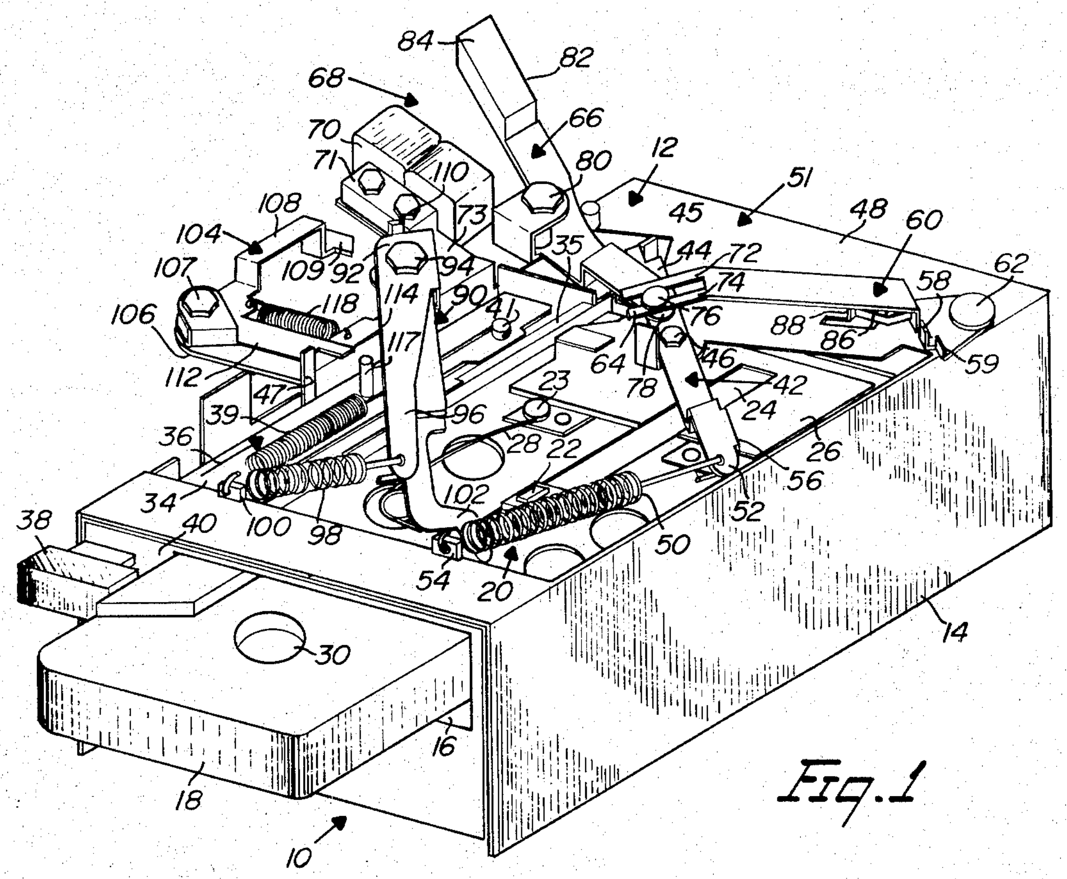
FIG. 1 is an isometric view of a cassette tape player including automatic cassette eject apparatus according to the invention.

Referring now to the drawings in greater detail wherein like numerals have been employed to designate similar parts throughout the various views, there is shown in FIG. 1 a cassette tape player 10 incorporating automatic cassette eject apparatus 12 mounted on an adapter bracket or frame 14 fitted onto the cassette player chassis in an overlying fashion.

The cassette player 10 is of a conventional design including a tunnel 16 into which a cassette 18 is inserted and is received by a carriage 20 (See FIGS. 3,4) provided therein. A member 22 is slidably mounted in a cut-out or track 24 located on a top wall of the carriage and an overcenter spring 28 for drawing the cassette into carriage 20 is connected to the slide member 22 and to a post 23 on the top wall of the carriage. The slide member is received in one of the spool openings (such as 30) provided in the cassette. An initial manual force on the cassette when inserted into the tunnel is necessary to move overcenter spring 28 from a first to a second stable state, thereby to draw the cassette into the tunnel to an intermediate position, shown in FIG. 3. As will be noted, in the intermediate position, the cassette is raised above the spindles 32 provided to drive the tape through the cassette when the latter is placed into the playback position in the cassette player (See FIG. 4*a*).

An actuator bar 34 is provided adjacent the tunnel and carriage 16, 20, respectively. The actuator bar which is coupled to the carriage 20 through an actuator arm 35 is movable inwardly of the player in the direction of arrow 36 upon the depression of the knob 38 extending outwardly from the front wall 40 of the player.

A spring 39 connected to a post 41 extending from the actuator bar, returns the bar to its initial position when knob 38 is released. Upstanding tabs 45 and 47 are connected to arm 35 for movement therewith.

Depression of knob 38 moves the actuator bar inwardly to move arm 35 rearward (in a direction opposite from arrow 36) to lower carriage 20 (See FIG. 4*a*), thereby to drop cassette 18 onto the spindles 32. Simultaneously with the lowering of cassette 18, a magnetic tape head and pressure roller (not shown) are moved into engagement with the tape for audibly reproducing recorded information thereon. Power to the tape drive spindle, and recording head, etc. is at this time also provided to the player through standard circuitry (not shown).

Figures 3, 3A, 4, 4A:
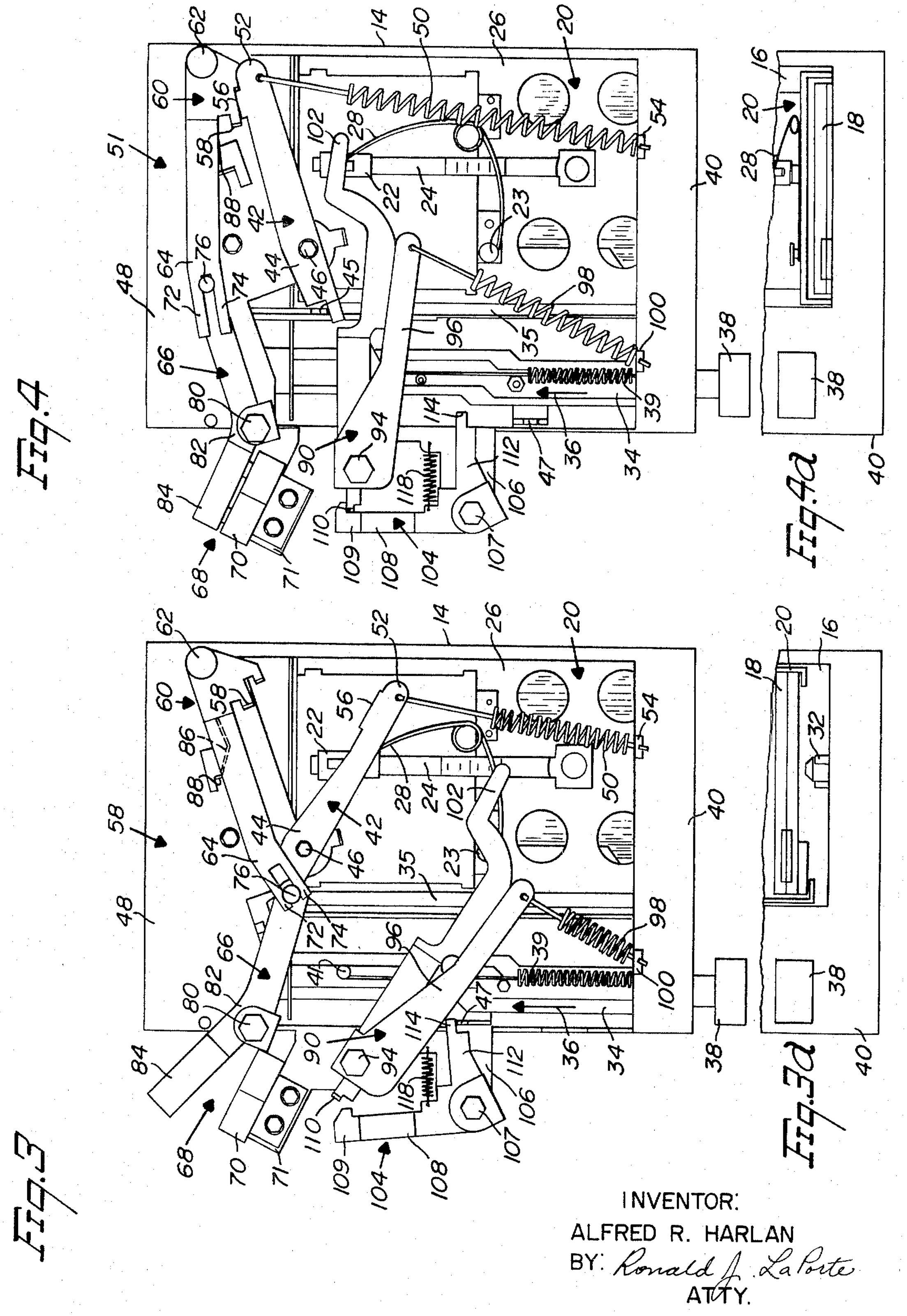
FIG. 3 is a top plan view of the cassette player of FIG. 1 as it appears with the cassette in an intermediate position.
FIG. 3*a* is a front fragmentary view of the cassette player of FIG. 3 illustrating the position of the cassette therein.
FIG. 4 is a top plan view of the cassette player of FIG. 1 as it appears with the cassette in the play position.
FIG. 4*a* is a front fragmentary view of the cassette player of FIG. 4 illustrating the position of the cassette therein.

In addition to operating the carriage 20 as described heretofore, the movement of actuator bar 34 causes the automatic cassette eject apparatus according to the invention to be actuated to an eject-ready condition. Movement of actuator bar 34 inwardly causes a lever arm 42 mounted at one end 44 by means of a fastener 46 to the upper surface 48 of wall 51 of frame 14, to be pivoted in a counter-clockwise direction as shown in FIGS. 1, 3 and 4 of the drawings. The arm 42 is moved from a first position (shown in FIGS. 1 and 3) to the second eject-ready position (shown in FIG. 4). The pivotal movement of the lever arm tensions a coil spring 50 attached to the free end 52 of the arm and to a tab 54 extending upwardly from the adapter frame 14. The energy stored in the tensioned spring 50, as will be explained hereinafter, is employed to remove the cassette from the play position upon removal of power from the cassette player.

Movement of lever arm 34 as described, causes a downwardly extending tab 56 on lever arm 42 to engage a first finger 58 extending from a latch arm 60 also mounted on surface 48 of wall 51 of the adapter frame by means of a fastener 62. Engagement of finger 58 by lever arm 34 pivots latch arm 60 in a clockwise direction as shown in the figures. The latch arm is coupled in pivotal and sliding fashion at the free end 64 thereof to an armature arm 66 of a solenoid assembly 68 including a holding coil 70 and a pole piece 71 mounted on an extension piece 73 extending from the wall 51 of frame 14. The free end 64 of latch arm 60 is fork shaped, having a pair of spaced tines 72, 74 between which is received a pin 76 mounted on the free end 78 of the armature arm.

The armature arm 66 is likewise mounted for pivotal movement on the top surface 48 of wall 51 by means of a fastener 80. The opposite free end 82 of the armature 66 includes a magnetically attractable armature piece 84 which is magnetically held by the energized holding coil 70 upon being moved into engagement therewith.

An overcenter or snap-over leaf spring 86 is connected between the latch arm 60 and an upstanding tab 88 extending from surface 48 of the wall 51. As will be explained in greater detail hereinafter, the leaf spring 86 aids in moving the armature piece 84 into positive engagement with the holding coil upon depression of actuator knob 38 to place the cassette 18 into the play position, and in returning the armature arm and latch arm 66, 60 respectively, to their initial positions upon removal of power from the player.

A second lever arm 90, also mounted on extension piece 73 adjacent holding coil 70 is provided for ejecting a cassette from the player upon removal of power. The arm is pivotally mounted at a first end 92 by means of a fastener 94. The arm 90 includes a first portion 96 connected by a coil spring 98 thereto and to an upstanding tab 100 formed on the frame 14. A second arm portion 102 is so positioned as to engage slide member 22 upon being moved to an ejectready position, as shown in FIG. 4.

A smaller, L-shaped latch arm 104 mounted on a second extension piece 106 by fastener 107 is provided to secure arm 90 into the eject-ready position against the tensioned coil spring 98. The energy stored in spring 98 serves to pull arm 90 rapidly to its initial position and to eject cassette 18 in the intermediate position, from tunnel 16 to the position shown in FIG. 1.

The latching arm 104 includes a first leg 108 having a coupling finger 109 for engaging an upstanding tab 110 extending from arm 90. The other leg 112 of the latch arm has an end 114 which is engaged by upstanding tab 47 mounted on actuator arm 35, upon the latter being moved in the direction of arrow 36 in response to the removal of power from the cassette player. Engagement of the last-mentioned elements rotates arm 104 and releases arm 90 held thereby to eject the cassette from the player. A spring 118 is connected between leg 108 of latch arm 104 and frame 14 to maintain the arm 104 normally in a latched position.

Figure 2:
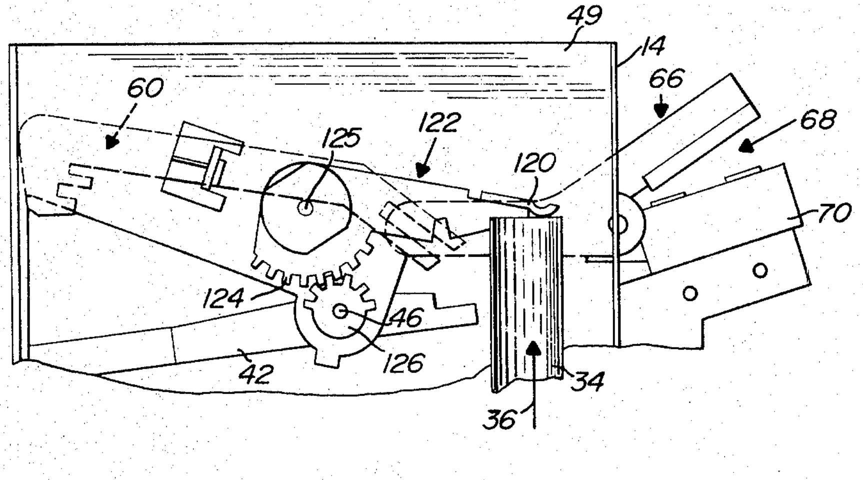
FIG. 2 is a fragmentary bottom view of the cassette player of FIG. 1 illustrating the operation of a portion of the eject apparatus.

For a better understanding of the actuation of the lever arm 42 from a normal or initial position to the eject-ready position, the reader's attention is directed to FIG. 2.

Upon depression of knob 38, actuator bar 34 is moved in the direction of arrow 36 into engagement with the free end 120 of an arm 122 mounted for pivotal movement by fastener 125 on the opposite surface 49 of the top wall 51 of frame 14. Gear teeth 124 formed along an edge of arm 122, mesh with a gear member 126 attached to fastener 46 holding arm 42 to the surface 48 of wall 51 of the frame. Gear 126 is rotatable with arm 42. Thus, movement of actuator bar 34 into engagement with end 120 of arm 122, causes the latter to be rotated about fastener 125. The meshing of gear teeth 124 with gear 126, rotates arm 42 into the eject-ready position, against the force of spring 50.

Typical operation of the cassette player and eject apparatus is as follows:

Initially, a cassette 18 is inserted into tunnel 16 and is urged manually further thereinto. Slide member 22 falls into the inner spindle receiving opening (such as 30) in the cassette and the overcenter spring 28 moves the cassette into the carriage 20.

Depression of knob 38 moves actuator bar 34 into engagement with arm 122, (FIG. 2) which in turn causes lever arm 42 to be rotated toward latch arm 60 and against the tension of spring 50. Simultaneously therewith, actuator arm 35 is moved in the direction opposite from arrow 36 to lower cassette 18 within carriage 20, from an intermediate position (FIGS. 3 and **3*a*) to a play position (FIGS. 4 and 4*a*) onto spindles 32. As explained heretofore a magnetic tape head and pressure roller (not shown) are also moved into engagement with the magnetic recording tape within cassette 18 in response to the rearward movement of actuator arm 35.**

The downwardly extending tab 56 of lever arm 42 engages finger 58 of latch arm 60, causing the latter to be rotated about pivot point 62 and in turn to rotate armature arm 66 coupled thereto about pivot point 80. After latch arm 60 has been rotated sufficiently, overcenter leaf spring 86 snaps from a first stable condition to a second stable condition, driving the armature piece 84 into positive engagement with holding coil 70, which was energized by circuitry (not shown) upon depression of knob 38. Holding coil 70 maintains the armature arm and latch arm in an eject-ready position (See FIG. 4) and the tab 56 of lever arm 42 is engaged and captured or held by a tab 59 adjacent tab 58 on latch arm 60 to maintain arm 42 in the eject-ready position.

Pin 117 extending from actuator bar 34 engages lever arm 90 to rotate the latter about fastener 94 to an eject-ready position. Tab 110 is thus engaged by finger 109 of the L-shaped latch arm 104 to secure the arm 90 in the lastmentioned position.

In the event power to the cassette player is removed, for instance through the opening of the ignition switch of an automobile, in which the device is mounted, or through any one of a series of other switches (not shown) which would remove power from the unit, holding coil 70 is de-energized. De-energization thereof releases armature piece 84 and permits the tensioned spring 50 to rotate lever arm 42 rapidly in a clockwise direction as shown in FIGS. 1, 3 and 4. The end 44 of lever arm 42 engages upstanding member 45 of actuator arm 35 coupled to carriage 20, which when moved in the direction of arrow 36 causes carriage 20 to be raised to an intermediate position. Thus, cassette 18 is lifted from the play position away from spindles 32.

Lever arm 42 pulls against finger 59 of latch arm 60 to initiate rotation of the last-mentioned arm in a counter-clockwise direction. Overcenter spring 86 snaps-over from the second to the first stable condition, driving the latch arm 60 and armature arm 66 to their initial positions.

Movement of member 45 in the direction of arrow 36 likewise moves upstanding member 47 coupled also to arm 35, in the same direction into engagement with leg 112 of arm 104, to pivot the last-mentioned arm, thereby releasing arm 90. Arm 90 is rotated by tensioned spring 98 in a clockwise direction. The end 102, as seen in FIG. 4, is aligned with and engages slide member 22, to pull the member forward for ejection of cassette 18 from carriage 20 and partially from the tunnel 16 of the cassette player.

Thus, the eject apparatus according to the invention provides an efficient means for removing a cassette from the play position in the event power to the cassette player in which the eject apparatus is incorporated, is removed. Efficient removal of the cassette eliminates damage to the elements of the cassette player and to the tape within the cassette itself.

It should be understood that while the eject apparatus has been shown mounted on an adapter unit fitted over a conventional cassette player, that the eject apparatus may be permanently affixed to the cassette player as well. Furthermore, while the description above has been directed to a cassette tape player unit, the eject apparatus according to the invention would operate equally efficiently in the case of a cartridge type tape player or the like mechanism.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a cassette tape player including a tunnel for receiving a cassette and manually actuable means movable from a first to a second position for moving the cassette from an inserted position to a playback position within said tunnel, respectively, automatic cassette eject means including pivotal lever means secured to said player and being coupled to said manual actuation means, said lever means being moved from a normal to an eject-ready position when said actuation means is moved to position said cassette to a playback position, resilient biasing means coupled to said pivotal lever means for storing energy when the cassette is moved from said inserted to said playback position, a solenoid having an armature and a holding coil, said armature being mounted on said player for movement toward and away from said holding coil, said holding coil arranged to receive energizing power for holding said armature thereto upon movement of the latter into engagement therewith, latch means mounted for movement on said player and being coupled to said armature and positioned for engagement with said pivotal lever means upon moving said lever means to said eject-ready position, said latch means retaining said pivotal lever means in said eject-ready position while said cassette is in said playback position, and overcenter spring means connected to said latch means and movable in snap-action fashion from a first to a second stable condition upon movement of said cassette from said inserted to said playback position for rapidly moving said armature into positive engagement with said holding coil, said holding coil, upon de-energization thereof, releasing said pivotal lever means from said eject-ready position, whereby said resilient biasing means returns said lever means to said normal position and said cassette is moved out of said playback position, said pivotal lever means pulling against said latch means to move the latter out of engagement therewith and to snap said overcenter spring means to said first stable condition said latch means thereby being returned to said first position.

2. A cassette tape player as claimed in claim 1 wherein said latch means include an arm mounted on said player for pivotal movement, said latch arm coupled pivotally to said armature and including finger means for engaging said pivotal lever means upon the latter being moved to said eject-ready condition to retain said pivotal lever means in said last-mentioned position.

3. A cassette tape player as claimed in claim 1 wherein said automatic cassette eject means includes a frame member, and wherein said lever means, solenoid and latch means are mounted on said frame member, said frame member being removably mounted on said cassette player.

4. Automatic cassette eject apparatus as claimed in claim 1 wherein said latch means includes a pivotally mounted arm, wherein said solenoid armature comprises a pivotally mounted arm, one end of which is magnetically attractable to said holding coil and the opposite end of which is coupled to said latch arm at a free end of the latter, said latch arm further including first and second finger means, said first finger means being engageable with said lever means upon the latter being moved from said normal to said eject-ready position, said latch arm being pivoted in response thereto, whereby said overcenter spring means is moved from said first to said second stable state to in turn move said one end of said armature into holding engagement with said holding coil, and said second finger means being releasably coupled to said lever arm upon the latter reaching said eject-ready position, thereby to retain said lever arm in said eject-ready position until said holding coil is de-energized.

* * * * *